(12) United States Patent
Klein et al.

(10) Patent No.: US 12,130,237 B2
(45) Date of Patent: Oct. 29, 2024

(54) METHOD FOR CALIBRATING A CAMERA OF A MOBILE DEVICE FOR DETECTING AN ANALYTE IN A SAMPLE

(71) Applicant: Roche Diabetes Care, Inc., Indianapolis, IN (US)

(72) Inventors: Timo Klein, Neustadt an der Weinstraße (DE); Max Berg, Mannheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 766 days.

(21) Appl. No.: 17/118,352

(22) Filed: Dec. 10, 2020

(65) Prior Publication Data

US 2021/0096083 A1    Apr. 1, 2021

Related U.S. Application Data

(63) Continuation of application No. PCT/EP2019/064671, filed on Jun. 5, 2019.

(30) Foreign Application Priority Data

Jun. 11, 2018 (EP) .................... 18176998

(51) Int. Cl.
   *G01N 21/84*     (2006.01)
   *G06T 7/80*      (2017.01)
   (Continued)

(52) U.S. Cl.
   CPC .......... *G01N 21/8483* (2013.01); *G06T 7/80* (2017.01); *G01N 21/274* (2013.01); *G01N 2021/478* (2013.01)

(58) Field of Classification Search
   CPC ............. G01N 21/8483; G01N 21/274; G01N 2021/478; G06T 7/80
   See application file for complete search history.

(56) References Cited

U.S. PATENT DOCUMENTS

2008/0192235 A1   8/2008   Komiya et al.
2013/0070108 A1   3/2013   Aerts et al.
(Continued)

FOREIGN PATENT DOCUMENTS

CN   101532948 A     9/2009
EP   1 528 380 A1    5/2005
(Continued)

OTHER PUBLICATIONS

International Search Report and Written Opinion of the International Searching Authority, PCT/EP2019/064671, Aug. 30, 2019, 10 pages.
(Continued)

*Primary Examiner* — Ping Y Hsieh
*Assistant Examiner* — Vaisali Rao Koppolu
(74) *Attorney, Agent, or Firm* — Bose McKinney & Evans LLP (57) ABSTRACT

A method for calibrating a camera of a mobile device for detecting an analyte in a sample. An image of an object is captured using the camera with an illumination source turned on. A first area is determined in the image which is affected by direct reflection of light originating from the illumination source and reflected by the object. A second area which does not substantially overlap with the first area is determined as a target area of a test strip. Also disclosed is a detection in which a sample is applied to a test strip and a visual indication is provided to position the test strip relative to the camera to thereby locate the test field of the strip in the target area. An image of the test field is captured using the camera while the illumination source is turned on, and analyte concentration is determined from the image.

17 Claims, 3 Drawing Sheets

(51) Int. Cl.
*G01N 21/27* (2006.01)
*G01N 21/47* (2006.01)

(56) References Cited

U.S. PATENT DOCUMENTS

| | | | |
|---|---|---|---|
| 2015/0055134 A1 | 2/2015 | Papautsky et al. | |
| 2015/0233898 A1* | 8/2015 | Chen | G01N 21/8483 422/404 |
| 2015/0254845 A1 | 9/2015 | Tsai et al. | |
| 2015/0359458 A1* | 12/2015 | Erickson | G06T 7/90 382/133 |
| 2016/0080548 A1* | 3/2016 | Erickson | G01N 21/80 382/128 |
| 2018/0031551 A1 | 2/2018 | Karlovac et al. | |
| 2018/0196037 A1* | 7/2018 | Polwart | G01N 21/8483 |
| 2021/0172945 A1* | 6/2021 | Armbruster | G01N 33/558 |

FOREIGN PATENT DOCUMENTS

| | | |
|---|---|---|
| EP | 1 801 568 A1 | 6/2007 |
| EP | 1 963 828 B1 | 3/2010 |
| EP | 2 916 117 A1 | 9/2015 |
| EP | 2 921 846 A2 | 9/2015 |
| EP | 3 108 244 A1 | 12/2016 |
| EP | 3 112 827 A1 | 1/2017 |
| JP | 2008-165806 A | 7/2008 |
| TW | 200944777 A | 11/2009 |
| TW | 201700965 A | 1/2017 |
| WO | WO 2007/079843 A2 | 7/2007 |
| WO | WO 2012/131386 A1 | 10/2012 |
| WO | WO 2014/025415 A2 | 2/2014 |
| WO | WO 2015/038717 A1 | 3/2015 |
| WO | WO 2015/120819 A1 | 8/2015 |

OTHER PUBLICATIONS

Hönes et al., Diabetes Technology and Therapeutics, vol. 10, Supplement 1, 2008, pp. 10-26.

* cited by examiner

METHOD FOR CALIBRATING A CAMERA OF A MOBILE DEVICE FOR DETECTING AN ANALYTE IN A SAMPLE

RELATED APPLICATIONS

This application is a continuation of PCT/EP2019/064671, filed Jun. 5, 2019, which claims priority to EP 18 176 998.5, filed Jun. 11, 2018, the entire disclosures of both of which are hereby incorporated herein by reference.

BACKGROUND

This disclosure refers to a calibration method for calibrating a camera of a mobile device for detecting an analyte in a sample and a detection method for detecting an analyte in a sample by using a camera of a mobile device. This disclosure further relates to a computer program with program means for executing the methods according to this disclosure. Further, this disclosure refers to a mobile device. Methods, computer programs and mobile devices according to this disclosure may be used in medical diagnostics, in order to qualitatively or quantitatively detect one or more analytes in one or more body fluids. Other fields of application of this disclosure, however, are possible.

In the field of medical diagnostics, in many cases, one or more analytes have to be detected in samples of a body fluid, such as blood, interstitial fluid, urine, saliva or other types of body fluids. Examples of analytes to be detected are glucose, triglycerides, lactate, cholesterol or other types of analytes typically present in these body fluids. According to the concentration and/or the presence of the analyte, an appropriate treatment may be chosen, if necessary.

Generally, devices and methods known to the skilled person make use of test elements comprising one or more test chemistries, which, in presence of the analyte to be detected, are capable of performing one or more detectable detection reactions, such as optically detectable detection reactions. With regard to these test chemistries, reference may be made, e.g., to J. Hoenes et al.: The Technology Behind Glucose Meters: Test Strips, Diabetes Technology & Therapeutics, Volume 10, Supplement 1, 2008, S-10 to S-26. Other types of test chemistry are possible and may be used for performing this disclosure.

In analytical measurements, specifically analytical measurements based on color formation reactions, one technical challenge resides in the evaluation of the color change which is due to the detection reaction. Besides using dedicated analytical devices, such as handheld blood glucose meters, the use of generally available electronics such as smart phones and portable computers has become more and more popular over the recent years. WO 2012/131386 A1 discloses a testing apparatus for performing an assay, the testing apparatus comprising: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

WO 2014/025415A2 discloses a method and device for performing color-based reaction testing of biological materials. The method includes capturing and interpreting digital images of an unexposed and later exposed instrument within an automatically calibrated environment. The instrument includes a Unique Identification (UID) label, Reference Color Bar (RCB) providing samples of standardized colors for image color calibration, and several test specific sequences of Chemical Test Pads (CTP). The method further includes locating the instrument in the image, extracting the UID, extracting the RCB, and locating the plurality of CTP in each image. The method further reduces image noise in the CTP and calibrates the image automatically according to lighting measurements performed on the RCB. The method further determines test results by comparing the color of the CTP image to colors in a Manufacturer Interpretation Color Chart (MICC). The method shows these results in graphical or quantified mode.

EP 1801568 A1 discloses a test strip and method for measuring analyte concentration in a biological fluid sample. The method involves positioning a camera at a test strip for pictorially detecting a color indicator and a reference color area. A measured value is determined for the relative position between the camera and the strip and compared with a desired value area. The camera is moved to reduce deflection relative to the strip during the deflection between the measured value and the desired value. An image area assigned to the indicator is localized in a colored image that is detected by the camera. An analyte concentration is determined in a sample by a comparison value.

EP 1963828 B1 discloses a method for measurement of the concentration of at least one analyte which is contained in a sample of a biological fluid, a) wherein a test strip is prepared, which has at least one test point, at least one time indicator and at least one reference color range which comprises the color white and/or a color scale, b) wherein the fluid sample is brought into contact with the test point and the time indicator, c) wherein a color indicator is arranged at the test point as a function of the concentration of the analyte, d) wherein the color of the time indicator is changed as a function of the time duration for which the fluid has been brought into contact with the test point and independently of the concentration of the at least one analyte, e) wherein a camera is positioned on the test strip, f) wherein at least one measured value for the relative position between the camera and the test strip is determined, and is compared with a nominal value range, g) wherein, if there is a discrepancy between the measured value and the nominal value range, the camera is moved relative to the test strip in order to reduce the discrepancy, and steps f) and g) are repeated, h) wherein the camera is used to record a color image on which at least the color indicator, the time indicator and the reference color range are imaged, j) wherein the image areas which are associated with the color indicator, the time indicator and the reference color range are localized in the color image, and the color values of these image areas are determined, k) wherein the time duration between the fluid sample being brought into contact with the test point and the recording of the color image is determined on the basis of the color value determined for the time indicator, with the aid of predetermined reference values, and l) wherein the analyte concentration in the sample is determined on the basis of the color values determined for the color indicator and the reference color range and on the basis of the time duration, with the aid of predetermined comparison values.

Reliability and accuracy of the analytical measurement using mobile computing devices generally depends on a large number of technical factors. Specifically, a large number of mobile devices having cameras is available on the market, all having different technical and optical properties which have to be considered for the analytical measurement. For example, WO 2007/079843 A2 describes a method for measuring a concentration of an analyte contained in a sample of a biological fluid. In said method, a test strip is provided which comprises at least one test point and at least one reference color section encompassing the color white and/or a color scale. The fluid sample is brought in contact with the test point, and a color indicator is disposed on the test point in accordance with the concentration of the analyte. A camera is placed on the test strip. At least one measured value is detected for the relative position between the camera and the test strip and is compared to a set value range. If the measured value deviates from the set value range, the camera is moved relative to the test strip to reduce the deviation. A colored image on which at least the color indicator and the reference color section are represented is detected with the aid of the camera. The image areas assigned to the color indicator and the color matching section are located, and the color values of said image areas are determined. The analyte concentration in the sample is determined based on the color values with the aid of predefined comparative values. EP 3 108 244 A1 and WO 2015/120819 A1 describe a test strip module including a case, a test strip in the case, and a position anchor extending down past a mating surface to a face of a mobile computing device. The position anchor has a shape matching a feature on the face of the mobile computing device.

WO 2015/038717 A1 describes a system and method for the analysis of a fluid. The system has an opaque container to receive a fluid sample; a color varying indicator disposed on a surface of the cup that when the cup contains a fluid sample, the surface is submerged in the fluid sample; a color standard to which a color of the color varying indicator is compared, disposed on the surface; a camera, the camera being disposed proximate to the container such that the camera has a view of the surface, the camera being coupled to a processor; an artificial light source, illuminating the surface with a standard illumination; a light diffuser disposed between the artificial light source and the surface. The processor receives images captured by the camera, extracts color values from the color varying indicator, standardizes the color values relative to the color standard, and quantitatively relates the color values to known color values of the color-varying indicator when exposed to a standardized quantity of a known reagent under test.

Despite the advantages involved in using mobile computing devices for the purpose of preforming an analytical measurement, several technical challenges remain. Specifically, reliability and accuracy of the measurements need to be enhanced and ensured. A major difficulty is the presence and impact of gloss. Using on-board illumination device and imaging devices of mobile computing devices may result in that light initially originating from the illumination device will be at least partially reflected by the test element. The light so reflected may interfere with evaluation of the color formed on a reagent filed of the test element, such that reliability and accuracy of measurement result cannot be ensured due to presence and impact of gloss. Furthermore, location of the gloss may depend on relative positioning of illumination device and camera of the mobile device which, due to huge number of different mobile devices available on the market may vary for different types or model of mobile device.

It is therefore desirable to provide methods and devices which address the above-mentioned technical challenges of analytical measurements using mobile devices such as consumer-electronics mobile devices, specifically multipurpose mobile devices which are not dedicated to analytical measurements such as smart phones or tablet computers. Specifically, methods and devices that ensure reliability and accuracy of the measurements are desired.

SUMMARY

This disclosure teaches a method for calibrating a camera of a mobile device for detecting an analyte in a sample, a detection method for detecting an analyte in a sample by using a camera of a mobile device method, a computer program and a mobile device with the features of the independent claims. Advantageous embodiments which might be realized in an isolated fashion or in any arbitrary combinations are listed in the dependent claims.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "image," "test strip," "test field," and "object," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect, a calibration method for calibrating a camera of a mobile device for detecting an analyte in a sample is disclosed. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:
a) capturing at least one image of at least one object by using the camera, wherein during said capturing an illumination source of the mobile device is turned on;
b) determining from the image captured in step a) at least one first area in the image which is affected by direct reflection of light originating from the illumination source and being reflected by the object; and
c) determining at least one second area in the image which essentially does not overlap with the first area and returning the second area as a target area for the location of a test field of a test strip in a subsequent detection step.

The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, as will be outlined in further detail below, the mobile device may also refer to a tablet computer or another type of portable computer having at least one camera.

The term "test strip" as used herein is a broad term and is to be given its ordinary and customary meaning to a person of ordinary skill in the art and is not to be limited to a special or customized meaning. The term specifically may refer, without limitation, to an arbitrary element or device configured for performing a color-change detection reaction. The test strip may particularly have a test field containing at least one test chemical for detecting the at least one analyte. The test element, as an example, may comprise at least one substrate, such as at least one carrier, with the at least one test field applied thereto or integrated therein. As an example, the at least one carrier may be strip-shaped, thereby rendering the test element a test strip. These test strips are generally widely in use and available. One test strip may carry a single test field or a plurality of test fields having identical or different test chemicals comprised therein. The test strip may have at least one sample applied thereto.

As further used herein, the term "test field" is a broad term and is to be given its ordinary and customary meaning to a person of ordinary skill in the art and is not to be limited to a special or customized meaning. The term specifically may refer, without limitation, to a coherent amount of the test chemical, such as to a field, e.g., a field of round, polygonal or rectangular shape, having one or more layers of material, with at least one layer of the test field having the test chemical comprised therein. Other layers may be present providing specific optical properties such as reflective properties, providing spreading properties for spreading the sample or providing separation properties such as for separating of particulate components of the sample, such as cellular components.

The term "test chemical" as used herein is a broad term and is to be given its ordinary and customary meaning to a person of ordinary skill in the art and is not to be limited to a special or customized meaning. The term specifically may refer, without limitation, to a chemical compound or a plurality of chemical compounds such as a mixture of chemical compounds suited for performing a detection reaction in the presence of the analyte, wherein the detection reaction is detectable by specific means, such as optically. The detection reaction specifically may be analyte-specific. The test chemical, in the present case, specifically may be an optical test chemical, such as a color-change test chemical which changes in color in the presence of the analyte. The color change specifically may depend on the amount of analyte present in the sample. The test chemical, as an example, may comprise at least one enzyme, such as glucose oxidase and/or glucose dehydrogenase. Additionally, other components may be present, such as one or more dyes, mediators and the like. Test chemicals are generally known to the skilled person and reference may be made to J. Hönes et al.: Diabetes Technology and Therapeutics, Vol. 10, Supplement 1, 2008, pp.10-26. Other test chemicals, however, are feasible, too.

The term "analyte" as used herein is a broad term and is to be given its ordinary and customary meaning to a person of ordinary skill in the art and is not to be limited to a special or customized meaning. The term specifically may refer, without limitation, to one or more specific chemical compounds and/or other parameters to be detected and/or measured. As an example, the at least one analyte may be a chemical compound which takes part in metabolism, such as one or more of glucose, cholesterol or triglycerides. Additionally or alternatively, other types of analytes or parameters may be determined, e.g., a pH value.

The term "detecting an analyte in a sample" as used herein is a broad term and is to be given its ordinary and customary meaning to a person of ordinary skill in the art and is not to be limited to a special or customized meaning. The term specifically may refer, without limitation, to a quantitatively and/or qualitatively determination of at least one analyte in an arbitrary sample. For example, the sample may comprise a body fluid, such as blood, interstitial fluid, urine, saliva or other types of body fluids. The result of the analytical measurement, as an example, may be a concentration of the analyte and/or the presence or absence of the analyte to be determined. Specifically, as an example, the analytical measurement may be a blood glucose measurement, thus the result of the analytical measurement may for example be a blood glucose concentration.

As used herein, the term "calibration" is a broad term and is to be given its ordinary and customary meaning to a person of ordinary skill in the art and is not to be limited to a special or customized meaning. The term calibration may refer to at least one process for ensuring pre-defined or pre-specified image capturing conditions and/or adjusting and/or adapting image capturing conditions dependent on the mobile device and/or camera hardware configurations, for example dependent on a type or model of the mobile device. The calibration method may be configured to ensure that pre-defined and/or pre-specified image capturing conditions are fulfilled during subsequent determination of the analyte in the sample. This may allow enhancing robustness, reliability and accuracy of the measurement.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, a two-dimensional or even three-dimensional optical information. As an example, the camera may comprise at least one camera chip, such as at least one CCD chip and/or at least one CMOS chip configured for recording images. For example, the camera may be a color camera, as will be described in detail below, comprising at least three color pixels. The camera may be a color CMOS camera. For example, the camera may comprise black and white pixels and color pixels. The color pixels and the black and white pixels may be combined internally in the camera. The camera may comprise at least one color camera and at least one black and white camera, such as a black and white CMOS. The camera may comprise at least one black and white CMOS chip. The camera generally may comprise a one-dimensional or two-dimensional array of image sensors, such as pixels. As an example, the camera may comprise at least 10 pixels in at least one dimension, such as at least 10 pixels in each dimension. It shall be noted, however, that other cameras are also feasible. The camera may be a camera of a mobile communications device. This disclosure specifically shall be applicable to cameras as usually used in mobile applications such as notebook computers, tablets or, specifically, cell phones such as smart phones. Thus, specifically, the camera may be part of a mobile device which, besides the at least one camera, comprises one or more data processing devices such as one or more data processors. Other cameras, however, are feasible. The camera, besides at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted, automatically or manually.

The camera specifically may be a color camera. Thus, such as for each pixel, color information may be provided or generated, such as color values for three colors R, G, B. A larger number of color values is also feasible, such as four colors for each pixel. Color cameras are generally known to the skilled person. Thus, as an example, each pixel of the camera chip may have three or more different color sensors, such as color recording pixels like one pixel for red (R), one pixel for green (G) and one pixel for blue (B). For each of the pixels, such as for R, G, B, values may be recorded by the pixels, such as digital values in the range of 0 to 255, depending on the intensity of the respective color. Instead of using color triples such as R, G, B, as an example, quadruples may be used, such as C, M, Y, K or RGGB, BGGR, RGBG, GRGB, RGGB or the like. The color sensitivities of the pixels may be generated by color filters, such as color filter arrays, for example by at least one Bayer filter, or by appropriate intrinsic sensitivities of the sensor elements used in the camera pixels. These techniques are generally known to the skilled person.

As used herein, without limitation, the term "image" specifically may relate to data recorded by using a camera, such as a plurality of electronic readings from an imaging device, such as the pixels of the camera chip. The image itself, thus, may comprise pixels, the pixels of the image correlating to pixels of the camera chip. Consequently, when referring to "pixels," reference is either made to the units of image information generated by the single pixels of the camera chip or to the single pixels of the camera chip directly. The image may comprise raw pixel data. For example, the image may comprise data in the RGGB space, single color data from one of R, G or B pixels, a Bayer pattern image or the like. The image may comprise evaluated pixel data such as a full-color image or an RGB image. The raw pixel data may be evaluated for example by using demosaicing algorithms and/or filtering algorithms. These techniques are generally known to the skilled person. The term "capturing at least one image" refers to one or more of imaging, image recording, image acquisition, image capturing. The term "capturing at least one image" may comprise capturing a single image and/or a plurality of images such as a sequence of images. For example, the capturing of the image may comprise recording continuously a sequence of images such as a video or a movie. The capturing in step a) may take place in a time frame of less than 1 s, preferably in a timeframe of less than 0.5 s, more preferably in a timeframe of less than 0.1 s. However, even longer time frames are possible.

The capturing of the at least one image may be initiated by the user action or may automatically be initiated, e.g., once the presence of the at least one object within a field of view and/or within a predetermined sector of the field of view of the camera is automatically detected. These automatic image acquisition techniques are known, e.g., in the field of automatic barcode readers, such as from automatic barcode reading apps.

For example, in step a), a plurality of images may be captured. The plurality of images may comprise the at least one sequence of images. In step b) at least one image of the plurality of images may be selected and used which fulfills at least one pre-defined and/or pre-specified selection criterion. The pre-defined and/or pre-specified selection criterion may be provided in a lookup table and/or may be determined empirically or semi-empirical. The selection criterion may further, as an example, be stored in a storage device comprised by the mobile device. Specifically, the selection criterion may be stored in the storage device by a software, more specifically by an app. The pre-defined or pre-specified selection criterion may be selected from the group consisting of: at least one sharpness criterion; at least one spatial criterion; ambient light conditions. The sharpness criterion may comprise at least one sharpness threshold above which or equal to which the image is considered as "focused" or "sharp." The image may be captured such that the object fills and/or covers a maximum area of the image. In step b), the image of the plurality of images may be selected and used in which the object fills and/or covers a maximum area of the image. The spatial criterion may comprise at least one angle threshold which refers to allowable deviations from a plane-parallel position of the mobile device with respect to an arbitrary plane, for example of the object. The spatial criterion may depend on a distance between the camera and the object. For example, angle deviations from a plane-parallel position of the mobile device may be below 25°, preferably below 20°, most preferably below 15° may be considered as allowable. Step b) may comprise selecting the best image from the sequence of images, for example, the image fulfilling the pre-defined or pre-specified selection criterion best. The sequence of images may be captured continuously during at least one time interval. Step b), for example the selection of the image, and/or step c), may be performed online, i.e., during capturing the image sequence. The capturing may be repeated, for example until at least one image is determined fulfilling the selection criterion.

A visual indication such as visual guidance may be given to the user when capturing the image. The visual indication may be given to the user prior to capturing the image. The visual indication may comprise at least one instruction such as a text message and/or a graphical instruction. For example, the visual indication may comprise a visualization of the object or parts of the object such as a contour and/or outline of the object. The visual indication may comprise an outline of the object or a reference region on the object, for example a frame which corresponds to a shape of the object, superimposed on the display of the mobile device, providing visual guidance for positioning the camera relative to the object. The capturing of the at least one image may be initiated automatically in case it is determined that the sharpness criterion and/or the spatial criterion may be fulfilled, in particular in case it is determined that the outline of the object of the visual indication overlays the object. The visual indication may depend on the object used in step a). For example, the visual indication such as a contour and/or outline of the object may be determined empirical and/or may be stored in at least one lookup table and/or in at least one data storage of the mobile device, e.g., by software, specifically by at least one app downloaded from an app store or the like. Additionally or alternatively, audio guidance or other type of guidance may be given.

As used herein, the term "object" refers to an arbitrary object which has pre-defined surface properties, in particular planar surface properties and/or pre-defined reflection properties. The object used in step a) may be selected from the group consisting of: at least one even surface; a reference card; at least one test strip for detecting the analyte in the sample, the test strip having at least one test field comprising at least one test chemical for performing an optical detection reaction in the presence of the analyte; at least one test strip container; at least one packaging, in particular of the test strips. The packaging may be a packaging selected from the group consisting of: a packaging for a single test strip, a packaging for a plurality of test strips such as two or more test strips, a test strip container. Thus, the object itself, such as one or more of a test strip container, a package for receiving the at least one test element or the test strip or a part thereof may function as object. In step a) a distance between the camera and the object may be from 0.03 m to 0.3 m, preferably from 0.03 to 0.15 m, most preferably from 0.03 to 0.1 m. Even smaller distances may be possible depending, e.g., on type of the mobile device, angle between object and camera and object depth.

The mobile device and the object may be positioned such that the camera of the mobile device and the object, in particular at least one surface of the object, are essential parallel to each other. As used herein, the term "essential parallel" refers to conditions in which the object and the camera are parallel to each other with a tolerance of, e.g., ±20° or less, preferably a tolerance of ±10° or less, more preferably a tolerance of ±5° or less. The object may comprise at least one position marker. A relative position and/or orientation between the object and the camera may be determined by using the position marker. For example, the position marker may comprise at least one OpenCV ArUco marker. Techniques for determining the position using OpenCV ArUco marker are generally known to the skilled person. Additionally, the mobile device may comprise at least one position sensor adapted to determine a spatial position, in particular an angular position and/or at least one orientation in space. For example, the object may be an even surface, e.g., of a table and/or wall and the mobile device may be positioned by a user parallel, for example above, to the even surface. For example, the object may be at least one packaging having at least one even surface, for example a cubic packaging. The mobile device and/or the packaging may be positioned plan-parallel to each other. For example, the object may be placed on a table and the mobile device may be positioned by a user relative to the object. Visual indication may be given to the user when positioning the object and the mobile device relative to each other in order to ensure parallel orientation. Specifically, the mobile device may comprise a display. The mobile device may be adapted to give the visual indication on the display. For example, the visual indication may comprise at least one prompt and/or at least one instruction to the user how to adapt and/or to change and/or to position the mobile device relative to the object and/or how to adapt and/or to change and/or to position the object relative to the mobile device. The visual indication may comprise at least one text message and/or at least one graphical instruction. In particular, visual indication may be given to the user when capturing the image of the object. The capturing of the at least one image may be initiated automatically in case it is determined that relative position and/or orientation may be fulfilled. This may allow hands-free operation, specifically calibration and/or determining of the analyte.

As used herein, the term "the illumination source of the mobile device" refers to an arbitrary light source of the mobile device. The term "illumination source" refers to at least one device adapted to generate light for illuminating the object. As used herein, the term "light" generally refers to electromagnetic radiation in one or more of the visible spectral range, the ultraviolet spectral range and the infrared spectral range. The term visible spectral range generally refers to a spectral range of 380 nm to 780 nm. Preferably, light as used within this disclosure is light in the visual spectral range. The illumination source may comprise at least one light-emitting diode integrated in the mobile device. The illumination source may have two states, an on-state in which it generates at least one light beam for illuminating the object and an off-state in which the illumination source is off. As used herein, the term "is turned on" refers to that the illumination source is switched on to illuminate the object or is in an on-state in which it generates the light beam for illuminating the object. The mobile device may comprise further illumination devices such as at least one illumination source adapted for illuminating the display and/or the display may be designed as further illumination source itself.

The calibration method may further comprise evaluating whether or not the illumination source is configured for providing sufficient illumination intensity for performing a detection method. The evaluating whether or not the illumination source is configured for providing sufficient illumination may use at least one threshold method. The sufficiency of the illumination intensity may depend on surface properties of the object and/or ambient light conditions. In particular, in case of bright objects having high refection properties lower light intensity may be sufficient compared to dark object having low reflection properties. Further, in case of bright ambient light conditions, for example due to sunlight, higher intensity may be required compared to shielded ambient light conditions.

As outlined above, from the image captured in step a) at least one first area in the image which is affected by direct reflection of light originating from the illumination source and being reflected by the object is determined. The term "first area" refers to an arbitrary shaped area in the image. In particular, the first area may be one or more of at least one stripe, at least one quadrant, at least one rectangular shaped area, at least one circle. For example, the first area may correspond to a circle with a radius of the light spot generated by direct reflections in the image. The illumination source of the mobile device may illuminate the object. However, in mobile devices the illumination source and the camera are positioned such that a light beam generated by the illumination source, in particular the flash light, is at least partially reflected by the object. The term "affected by direct reflection of light originating from the illumination source" refers to a light spot in the image generated by direct reflection of the light beam generated by the illumination source. The light spot in the image may be a region which is brighter than surrounding image areas.

A histogram analysis of the image may be used for determining the first area in step b). The histogram analysis may comprise determining a position of the first area in the image. The histogram analysis may comprise determining a maximum intensity in the image and to determine a position of the maximum intensity in the image. The first area may be determined by using at least one threshold of intensity in the histogram analysis. The histogram analysis may comprise at least one two-dimensional Gaussian fit. For example, image regions with intensities above 1σ may be considered as first area. The histogram analysis may be used to determine if the illumination source works sufficiently, i.e., that a suitable amount of light is generated to illuminate the object.

In step c) at least one second area is determined in the image which essentially does not overlap with the first area and returning the second area as a target area for the location of a test field of a test strip in a subsequent detection step. The detection step may be performed subsequent to, in particular after, the calibration method. Thus, the detection step may not be part of the calibration method. The term "second area" refers to an area or zone of the image different from the first area, wherein small overlaps of the first and second area are possible. The second area may be a continuous region of the image. As used herein, the term "target area" refers to a region in which the test field of the test strip may be located in the subsequent detection step. The target region may be a predetermined or pre-specified region in which the test field of the test strip may be supposed to be located during capturing the image. The second area may be determined such that influences due to direct reflection of the light from the illumination source are prevented and/or minimized and/or at least significantly reduced. The target area may be determined to be off a zone, specifically off the first area, which is affected by direct optical reflection of the light from the illumination source. In addition, the target area may be determined such that determination of the analyte is possible, e.g., that the test field is illuminated sufficiently and lies within the cameras field of view. The second area may be determined to be an area of the image with essential homogenous illumination. The term "essential homogenous illumination" refers to conditions of homogenous illumination with tolerances of 10% or less, preferably 5% or less, most preferably 1% or less. The second area may be determined to be an area with illumination intensities below at least one intensity threshold. The second area may be selected that illumination generated by the light spot from direct reflections is minimized.

The detection method, as will be outlined below, comprises at least one step in which a visual indication for the user is provided to position the test strip relative to the camera such that the test field at least partially is located in the target area. The target area may have a shape identical with the shape or parts of the shape of the test strip. The target area may be configured as an outline or overlay of the test strip. The visual indication may be a superposition of a camera's live image on a display of the mobile device with the target area, e.g., the outline of the test strip. Thus, when the test strip is positioned in the field of view of the camera the visual indication will show an overlay of the target area and the test strip allowing the user to match the target area and easy positioning of the test strip.

As used herein, the term "essentially do not overlap" refers to that the first area and the second area are spatially separated regions. However, regions of overlap may be possible which do not influence determining of the analyte. For example, areas of the first area and the second area may overlap less than 10%, preferably less than 5%, most preferably less than 1%. For example, the captured image may be segmented into at least four segments, for example in quadrants. The first area may be assigned to at least one first segment of the image. The second area may be assigned to at least one second segment of the image different from the first segment. For example the first area may be determined to be in a lower left quadrant. The second area may be assigned to an upper left quadrant and/or an upper right quadrant and/or to a lower right quadrant.

The term "returning the second area as a target area" refers to that at least one information of a location of the target area is generated. The information of the location of the target area may be provided, e.g., as a prompt, to computing means, for example to an external computing means or computing means of the mobile device such as a processor. The computing means may adapt and/or generate the visual indication for positioning the test strip and the mobile device relative to each other based on the information of the location of the target area.

In a further aspect of this disclosure, a detection method for detecting an analyte in a sample by using a camera of a mobile device is disclosed. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed. The method comprising the following steps:

i) calibrating the camera by using the calibration method according to this disclosure;
ii) providing at least one test strip for detecting the analyte in the sample, the test strip having at least one test field comprising at least one test chemical for performing an optical detection reaction in the presence of the analyte;
iii) applying at least one sample to the test field of the test strip;
iv) providing visual indication for the user to position the test strip relative to the camera such that the test field at least partially is located in the target area;
v) capturing at least one image of the test field by using the camera, wherein during said capturing the illumination source of the mobile device is turned on; and
vi) determining, from the image captured in step v), the analyte concentration in the sample.

With respect to embodiments and definition of the detection method reference is made to the description of the calibration method above and as described in further detail below. In particular, with respect to method step i), reference may be made to the description of the calibration method above.

As used herein, the term "visual indication" refers to visual guidance for a user how to position the mobile device and the test strip relative to each other. The mobile device may comprise a display which may be adapted to display the visual indication. The visual indication may comprise at least one instruction for the user such as a text message, for example a prompt, and/or at least one graphical instruction.

For example, the visual indication may comprise a visualization of the test strip or parts of the test strips such as a contour and/or outline of the test strip. The visual indication may specifically be a visual guidance and may be or may comprise an outline, for example in a shape of the test strip, superimposed on the display of the mobile device, providing visual guidance for positioning the camera relative to the test strip. The visual indication may comprise a visualization of the both of the mobile device and the test strip relative to each other. The visual indication may comprise positioning information such orientation and/or distance prompts, for example at least one arrow and/or at least one text message. The term "at least partially located in the target area" refers to that the test strip and/or the mobile device are positioned such that the test strip overlays and/or covers and/or matches completely with the target area with tolerances of 20% or less, preferably of 10% or less, most preferably of 5% or less.

The determining of the analyte concentration may comprise an optical detection. As used herein, the term "optical detection" refers to a detection of a reaction using an optical test chemical, such as a color-change test chemical which changes in color in the presence of the analyte. The color change specifically may depend on the amount of analyte present in the sample. Step vi) may comprise analyzing the color of a spot on the test field of the test strip, said spot at least partially comprising the sample. Techniques for determining the analyte by optical detection and in particular analyzing color of the spot on the test filed are generally known to the skilled person. For evaluating the at least one image and deriving the at least one analytical information thereof, several algorithms may be used which generally are known to the skilled person in the field of analytics, such as in the field of blood glucose monitoring. Thus, as an example, a color of the test element, such as a color of at least one test field having at least one test chemical, may be evaluated. As an example, when evaluating the image, a region of interest may be defined within the image of the test element, such as a region of interest within a test field of the test element, and an analysis of the color may be performed, such as a statistical analysis. As an example, a rectangular, square, polygonal, oval or circular region of interest may be defined within the part of the image which is recognized to be an image of the test field. Subsequently, a statistical analysis of the color of the pixels within the region of interest may be performed. As an example, one or more color coordinates may be derived for the pixels, and a statistical analysis of the color coordinates may be performed over the region of interest. As an example, the center of the distribution of the at least one color coordinate may be determined. The term "color coordinate" as used herein is a broad term and is to be given its ordinary and customary meaning to a person of ordinary skill in the art and is not to be limited to a special or customized meaning. The term specifically may refer, without limitation, to the coordinate of an arbitrary color coordinate system used for describing a color using coordinates. Several color coordinate systems are generally known to the skilled person and may also be used in the context of this disclosure. Thus, as an example, a colorimetric coordinate system or a coordinate system may be used which is based on the human perception, such as the CIE 1964 color space, the Munsell color system or other coordinate systems, such as R, G, B, L, a, b.

Thus, for deriving the analytical information from the image, as an example, a predetermined or determinable relationship between the at least one color coordinate of the test element, such as the test field, may be monitored. As outlined above, statistical analysis may be performed over the test element or a part thereof, such as over a test field containing the at least one test chemical and/or over a region of interest within the test field containing the at least one test chemical. Thus, as an example, the at least one test field within the image of the test element may be recognized, preferably automatically, e.g., by pattern recognition and/or other algorithms as described in examples below. Again, one or more regions of interest may be defined within the partial image of the test field. Over the region of interest, color coordinates, e.g., again blue color coordinates and/or other color coordinates, may be determined, e.g., again by using one or more histograms. The statistical analysis may comprise sitting one or more fitting curves, such as described above, to the at least one histogram, thereby, e.g., determining a center of a peak. Thus, the color formation reaction may be monitored by using one or more images, wherein, for the one or more images, by using statistical analysis, the center of the peak may be determined, thereby determining a color shift within the at least one coordinate. Once the color formation reaction is finished or has reached a predetermined or determinable endpoint, as the skilled person generally knows, e.g., from blood glucose monitoring, the shift in the at least one color coordinate or an endpoint color coordinates may be determined and may be transformed into, e.g., a concentration of the analyte in the sample by using a predetermined or determinable correlation between the color coordinate and the concentration. The correlation, as an example a transformation function, a transformation table or a lookup table, may be determined, e.g., empirically and may, as an example, be stored in at least one data storage device of the mobile device, e.g., by the software, specifically by the app downloaded from an app store or the like.

As will be outlined in further detail below, the calibration method and the detection method may fully or partially be computer implemented, specifically on a computer of the mobile device, such as a processor of the mobile device. Thus, specifically, the methods may comprise using at least one processor and software instructions for performing at least method steps b) and c) of the calibration method and/or one or more of method steps i), iv) and vi) of the detection method. Specifically, the methods may fully or partially be implemented as so-called apps, e.g., for Android or iOS, and may, as an example, be downloadable from an app store. The software instructions, specifically the app, further may provide user instructions, e.g., by one or more of a display, by audio instructions or other instructions, in order to support the method steps of the calibration method and/or the detection method. Therein, as indicated above, method steps a), b) and c) may also fully or partially be computer implemented, e.g., by automatically taking the at least one image of the at least one object by using the camera once the object is within a field of view of the camera and/or within a certain range within the field of view. The processor for performing the calibration method and/or the detection method specifically may be part of the mobile device.

As outlined above, the mobile device specifically may be a mobile computer and/or a mobile communications device. Thus, specifically, the mobile device may be selected from the group consisting of: a mobile communications device, specifically a smart phone; a portable computer, specifically a notebook; a tablet computer.

As indicated above, further method steps may be computer implemented or computer assisted, specifically by a processor of the mobile device. Thus, as an example, the visual guidance for a user for positioning the mobile device relative to the object and/or test strip may be computer implemented or computer assisted. Additionally or alternatively, audio guidance or other type of guidance may be given.

In a further aspect of this disclosure, a computer program including computer-executable instructions for performing the calibration method according to any one of the embodiments as described herein is disclosed. Specifically the computer-executable instructions may be suited for performing one or more of method steps a), b) and c). In particular, the program is executed on a computer or a computer network, specifically on a processor of a mobile device having at least one camera.

Thus, generally speaking, disclosed and proposed herein is a computer program including computer-executable instructions for performing the calibration method according to this disclosure in one or more of the embodiments enclosed herein when the program is executed on a computer or computer network. Specifically, the computer program may be stored on a computer-readable data carrier. Thus, specifically, one, more than one or even all of method steps as indicated above may be performed by using a computer or a computer network, preferably by using a computer program. The computer specifically may be fully or partially integrated into the mobile device, and the computer programs specifically may be embodied as a software app. Alternatively, however, at least part of the computer may also be located outside the mobile device.

Further disclosed and proposed herein is a data carrier having a data structure stored thereon, which, after loading into a computer or computer network, such as into a working memory or main memory of the computer or computer network, may execute the detection method according to one or more of the embodiments disclosed herein, specifically one or more of the method steps mentioned above.

Further disclosed and proposed herein is a computer program product with program code means stored on a machine-readable carrier, in order to perform the calibration method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the calibration method according to one or more of the embodiments disclosed herein, specifically one or more of the steps of the calibration method as mentioned above.

Specifically, further disclosed herein are:

a computer or computer network comprising at least one processor, wherein the processor is adapted to perform the calibration method according to one of the embodiments described in this description, a computer loadable data structure that is adapted to perform the calibration method according to one of the embodiments described in this description while the data structure is being executed on a computer, a computer program, wherein the computer program is adapted to perform the calibration method according to one of the embodiments described in this description while the program is being executed on a computer, a computer program comprising program means for performing the calibration method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the calibration method according to one of the embodiments described in this description after having been loaded into a main and/or working storage of a computer or of a computer network, and a computer program product having program code means, wherein the program code means can be stored or are stored on a storage medium, for performing the calibration method according to one of the embodiments described in this description, if the program code means are executed on a computer or on a computer network.

In a further aspect of this disclosure, a computer program including computer-executable instructions for performing the detection method according to any one of the embodiments as described herein is disclosed. Specifically the computer-executable instructions may be suited for performing one or more of method steps i) to vi). In particular, the program is executed on a computer or a computer network, specifically on a processor of a mobile device having at least one camera.

Thus, generally speaking, disclosed and proposed herein is a computer program including computer-executable instructions for performing the detection method according to this disclosure in one or more of the embodiments enclosed herein when the program is executed on a computer or computer network. Specifically, the computer program may be stored on a computer-readable data carrier. Thus, specifically, one, more than one or even all of method steps as indicated above may be performed by using a computer or a computer network, preferably by using a computer program. The computer specifically may be fully or partially integrated into the mobile device, and the computer programs specifically may be embodied as a software app. Alternatively, however, at least part of the computer may also be located outside the mobile device.

Further disclosed and proposed herein is a data carrier having a data structure stored thereon, which, after loading into a computer or computer network, such as into a working memory or main memory of the computer or computer network, may execute the calibration method according to one or more of the embodiments disclosed herein, specifically one or more of the method steps mentioned above.

Further disclosed and proposed herein is a computer program product with program code means stored on a machine-readable carrier, in order to perform the detection method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the detection method according to one or more of the embodiments disclosed herein, specifically one or more of the steps of the detection method as mentioned above.

Specifically, further disclosed herein are:
- a computer or computer network comprising at least one processor, wherein the processor is adapted to perform the detection method according to one of the embodiments described in this description,
- a computer loadable data structure that is adapted to perform the detection method according to one of the embodiments described in this description while the data structure is being executed on a computer,
- a computer program, wherein the computer program is adapted to perform the detection method according to one of the embodiments described in this description while the program is being executed on a computer,
- a computer program comprising program means for performing the detection method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the detection method according to one of the embodiments described in this description after having been loaded into a main and/or working storage of a computer or of a computer network, and
- a computer program product having program code means, wherein the program code means can be stored or are stored on a storage medium, for performing the detection method according to one of the embodiments described in this description, if the program code means are executed on a computer or on a computer network.

In a further aspect of this disclosure, a mobile device for performing an analytical measurement is disclosed. The mobile devices comprises:
- at least one camera;
- at least one illumination source; and
- at least one processor, comprising program means for performing the calibration method according to one of the preceding embodiments.

For most of the terms used herein and possible definitions, reference may be made to the description of the methods above.

The processor further may comprise program means for performing the detection method according to any one of the preceding embodiments. The mobile device may be a mobile communications device.

The methods and devices according to this disclosure may provide a large number of advantages over known methods and devices for analytical measurements. This disclosure may improve reliability and user-friendliness of the process of performing an analytical measurement, compared to processes known from the art. Specifically, this disclosure may improve the reliability and user-friendliness of an application, e.g., an app, including computer-executable instructions for performing an analytical measurement, compared to known apps or computer programs. In particular, this disclosure may allow ensuring robust, in particular non-varying, image capturing conditions for different mobile devices and/or camera hardware configurations, such as different positions of the LED flash relative to the camera for each specific mobile device. Specifically this is ensured by dynamically positioning a test strip outline, such as a frame of the test strip for test strip recognition, on a mobile device's display off the zone which is affect by direct optical reflection of light initially originating from the illumination source and being reflected by the test strip. This disclosure may provide an improved reliability and accuracy of the apps or computer programs using the mobile's camera images because an impact of gloss is essentially avoided or at least significantly reduced.

Summarizing and without excluding further possible embodiments, the following embodiments may be envisaged:

Embodiment 1: A calibration method for calibrating a camera of a mobile device for detecting an analyte in a sample, comprising:
a) capturing at least one image of at least one object by using the camera, wherein during said capturing an illumination source of the mobile device is turned on;
b) determining from the image captured in step a) at least one first area in the image which is affected by direct reflection of light originating from the illumination source and being reflected by the object; and
c) determining at least one second area in the image which essentially does not overlap with the first area and returning the second area as a target area for the location of a test field of a test strip in a subsequent detection step.

Embodiment 2: The calibration method according to the preceding embodiment, wherein a histogram analysis of the image is used for determining the first area in step b).

Embodiment 3: The calibration method according to the preceding embodiment, wherein the first area is determined by using at least one threshold of intensity in the histogram analysis.

Embodiment 4: The calibration method according to any one of the two preceding embodiments, wherein the histogram analysis comprises at least one two-dimensional Gaussian fit.

Embodiment 5: The calibration method according to any one of the preceding embodiments, wherein the captured image is segmented into at least four segments, wherein the fist area is assigned to at least one first segment of the image, wherein the second area is assigned to at least one second segment of the image different from the first segment.

Embodiment 6: The calibration method according to any one of the preceding embodiments, wherein the calibration method further comprises evaluating whether or not the illumination source is configured for providing sufficient illumination intensity for performing a detection method.

Embodiment 7: The calibration method according to the preceding embodiment, wherein the evaluating whether or not the illumination sources configured for providing sufficient illumination uses at least one threshold method.

Embodiment 8: The calibration method according to any one of the preceding embodiments, wherein the calibration method further take into account a perspective and/or an angle between the camera and the object.

Embodiment 9: The calibration method according to the preceding embodiment, wherein the object comprises at least one position marker wherein a relative position and/or orientation between the object and the camera is determined by using the position marker.

Embodiment 10: The calibration method according to any one of the preceding embodiments, wherein in step a) a plurality of images is captured, wherein the plurality of images comprises at least one sequence of images, and wherein in step b) at least one image of the plurality of images is selected and used which fulfills at least one pre-defined selection criterion.

Embodiment 11: The calibration method according to the preceding embodiment, wherein the sequence of images is captured continuously during at least one time interval, wherein steps b) and/or c) are preformed during capturing the image sequence.

Embodiment 12: The calibration method according to any one of the preceding embodiments, wherein the camera is the camera of a mobile communications device.

Embodiment 13: The calibration method according to the preceding any one of the preceding embodiments, wherein in step a) a distance between the camera and the object is from 0.03 m to 0.3 m, preferably from 0.03 to 0.15 m, most preferably from 0.03 to 0.1 m.

Embodiment 14: The calibration method according to any one of the preceding embodiments, wherein the object used in step a) is selected from the group consisting of: at least one even surface; a reference card; at least one test strip for detecting the analyte in the sample, the test strip having at least one test field comprising at least one test chemical for performing an optical detection reaction in the presence of the analyte; at least one test strip container; at least one packaging, in particular of the test strips.

Embodiment 15: The calibration method according to the preceding embodiment, wherein the test strip has at least one sample applied thereto.

Embodiment 16: The calibration method according to any one of the preceding embodiments, wherein the illumination source of the mobile device comprises at least one light-emitting diode integrated in the mobile device.

Embodiment 17: The calibration method according to any one of the preceding embodiments, wherein the capturing in step a) takes place in a time frame of less than 1 s, preferably in a timeframe of less than 0.5 s, more preferably in a timeframe of less than 0.1 s.

Embodiment 18: A detection method for detecting an analyte in a sample by using a camera of a mobile device, the method comprising:
  i) calibrating the camera by using the calibration method according to any one of the preceding embodiments;
  ii) providing at least one test strip for detecting the analyte in the sample, the test strip having at least one test field comprising at least one test chemical for performing an optical detection reaction in the presence of the analyte;
  iii) applying at least one sample to the test field of the test strip;
  iv) providing visual indication for the user to position the test strip relative to the camera such that the test field at least partially is located in the target area;
  v) capturing at least one image of the test field by using the camera, wherein during said capturing the illumination source of the mobile device is turned on; and
  vi) determining, from the image captured in step v), the analyte concentration in the sample.

Embodiment 19: The detection method according to the preceding embodiment, wherein step vi) comprises analyzing the color of a spot on the test field of the test strip, said spot at least partially comprising the sample.

Embodiment 20: A computer program comprising program means for performing the calibration method according to one of the preceding embodiments referring to a calibration method while the computer program is being executed on a computer or on a computer network, specifically on a processor of the mobile device.

Embodiment 21: The computer program according to the preceding embodiment, wherein the computer program comprises program means for
  determining from the image captured in step a) at least one first area in the image which is affected by direct reflection of light originating from the illumination source and being reflected by the object; and
  determining at least one second area in the image which essentially does not overlap with the first area and returning the second area as a target area for the location of a test field of a test strip in a subsequent detection step.

Embodiment 23: A computer program comprising program means for performing the detection method according to one of the preceding embodiments referring to a detection method while the computer program is being executed on a computer or on a computer network, specifically on a processor of the mobile device.

Embodiment 24: The computer program according to the preceding embodiment, wherein the computer program comprises program means for
  calibrating the camera by using the calibration method according to any one of the preceding embodiments;
  providing visual indication for the user to position the test strip relative to the camera such that the test field at least partially is located in the target area; and
  determining, from the image captured in step v), the analyte concentration in the sample.

Embodiment 25: A mobile device, comprising:
  at least one camera;
  at least one illumination source; and
  at least one processor, comprising program means for performing the calibration method according to one of the preceding embodiments referring to a calibration method.

Embodiment 26: The mobile device according to the preceding embodiment, wherein the processor further comprises program means for performing the detection method according to any one of the preceding embodiments referring to a detection method.

Embodiment 27: The mobile device according to any one of the two preceding embodiments, wherein the mobile device is a mobile communications device.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
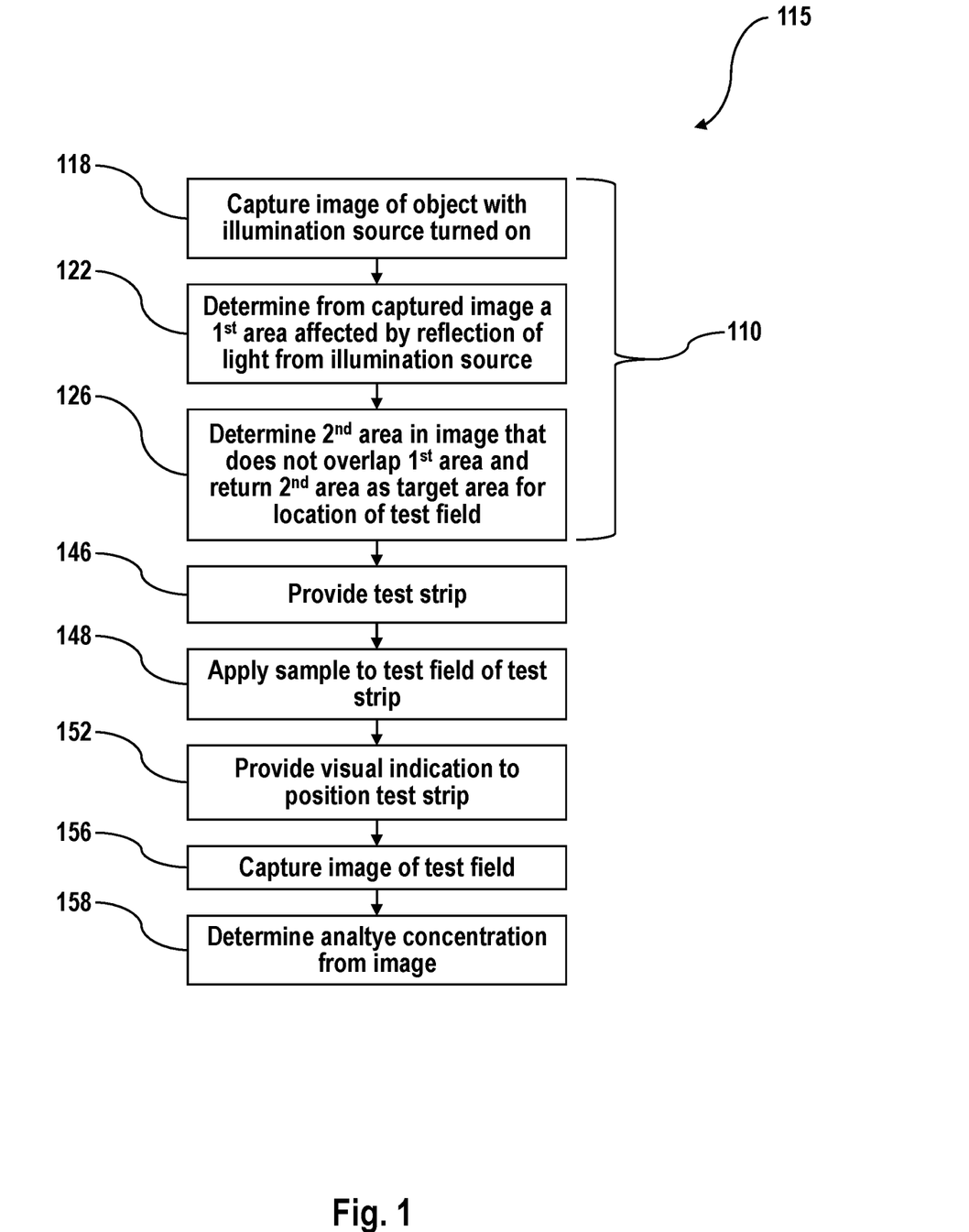
FIG. 1 shows a flow chart of a calibration method and a method for detecting an analyte.

FIG. 1 shows a flow chart of a calibration method 110 for calibrating a camera 112 of a mobile device 114 for detecting an analyte in a sample and of a method for detecting an analyte 115. The calibration method 110 comprises the following steps:

a) (denoted with reference number 118) capturing at least one image of at least one object 116 by using the camera 112, wherein during said capturing an illumination source 120 of the mobile device 114 is turned on;

b) (denoted with reference number 122) determining from the image captured in step a) at least one first area 124 in the image which is affected by direct reflection of light originating from the illumination source 120 and being reflected by the object 116; and c) (denoted with reference number 126) determining at least one second area 128 in the image which essentially or substantially does not overlap with the first area 124 and returning the second area 128 as a target area 130 for the location of a test field 132 of a test strip 134 in a subsequent detection step.

Figure 2:
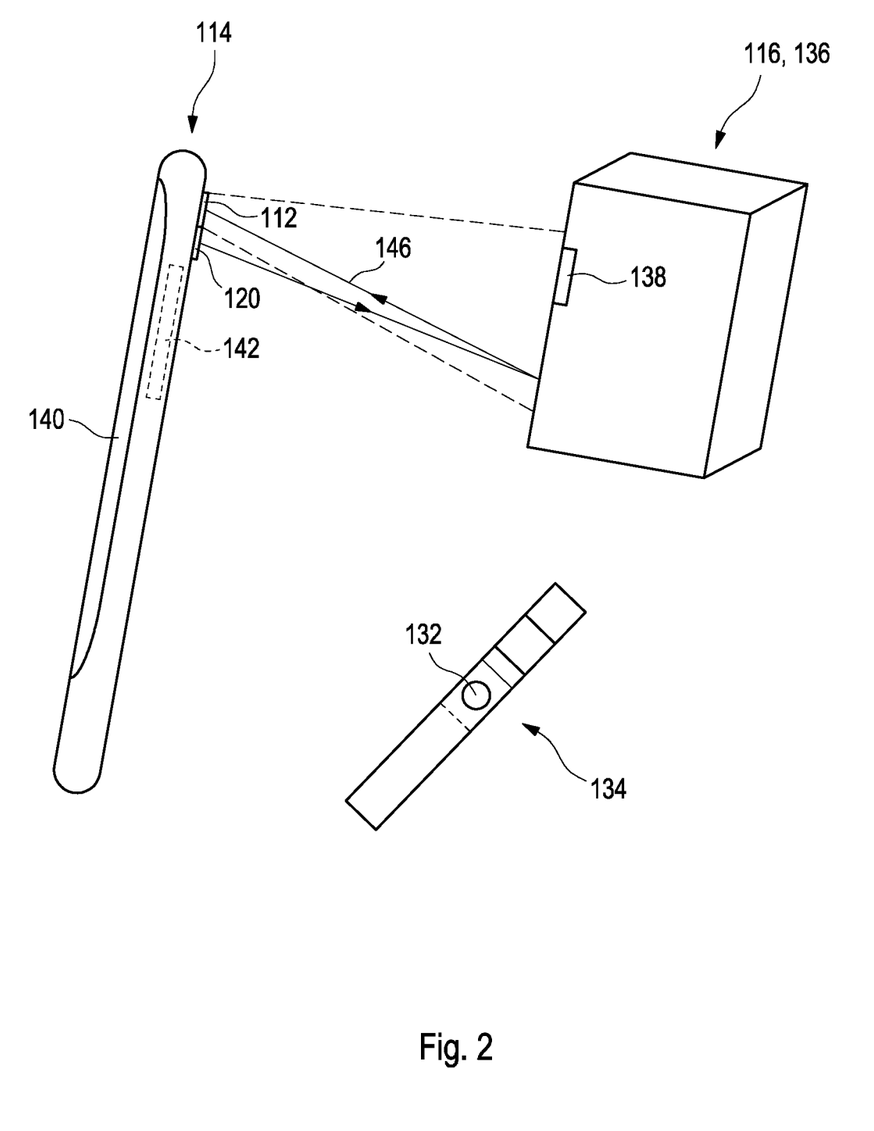
FIG. 2 shows a perspective view of an embodiment of a mobile device for performing a calibration method according to this disclosure.

In FIG. 2 a mobile device 114 for performing the calibration method 110 is shown in a perspective view. Furthermore the at least one object 116 is shown. The object 116 may be selected from the group consisting of: at least one even surface; a reference card; the at least one test strip 134 for detecting the analyte in the sample, the test strip 134 having at least one test field 132 comprising at least one test chemical for performing an optical detection reaction in the presence of the analyte; at least one test strip container; at least one packaging 136, in particular of the test strips 134. In the embodiment shown in FIG. 2, the object 116 may be a packaging 136. In step a) 118 a distance between the camera 112 and the object 116 may be from 0.03 m to 0.3 m, preferably from 0.03 to 0.15 m, most preferably from 0.03 to 0.1 m.

The mobile device 114 and the object 116 may be positioned such that the camera 112 of the mobile device 114 and the object 116, in particular at least one surface of the object 116, are essential parallel to each other. The object 116 may comprise at least one position marker 138, for example, at least one OpenCV ArUco marker. A relative position and/or orientation between the object 116 and the camera 112 may be determined by using the position marker 138, in particular the OpenCV ArUco marker. As shown in FIG. 2, the object 116 may be the at least one packaging 136 having at least one even surface comprising the at least one position marker 138. For example, the packaging 136 may be a cubic packaging. The mobile device 114 and/or the packaging 136 may be positioned plan-parallel to each other. For example, the object 116 may be placed on a table and the mobile device 114 may be positioned by a user relative to the object 116. Visual indication may be given to the user when positioning the object 116 and the mobile device 114 relative to each other. Specifically, the mobile device 114 may comprise a display 140 and visual indication may be given on the display 140. The mobile device 114 may comprise at least one processor 142. The processor 142 may be adapted to generate the visual indication. For example, the visual indication may comprise at least one prompt and/or at least one instruction to the user how to adapt and/or to change and/or to position the mobile device 114 relative to the object 116 and/or how to adapt and/or to change and/or to position the object 116 relative to the mobile device 114. The visual indication may comprise at least one text message and/or at least one graphical instruction. In particular, visual indication may be given to the user when capturing the image of the object 116. The capturing of the at least one image may be initiated automatically in case it is determined that relative position and/or orientation may be fulfilled. This may allow hands-free operation, specifically calibration and/or determining of the analyte.

The illumination source 120 may comprise at least one light-emitting diode integrated in the mobile device 114. The illumination source 120 may have two states, an on-state in which it generates light beam for illuminating the object 116 and an off-state in which the illumination source 120 is off. The mobile device 114 may comprise further illumination devices such as at least one illumination source illuminating the display 140 and/or the display 140 may be designed as further illumination source itself. The calibration method 110 may further comprise evaluating whether or not the illumination source 120 is configured for providing sufficient illumination intensity for performing a detection method. The evaluating whether or not the illumination source 120 is configured for providing sufficient illumination may use at least one threshold method. The sufficiency of the illumination intensity may depend on surface properties of the object 116 and/or ambient light conditions. In particular, in case of bright objects 116 having high refection properties lower light intensity may be sufficient compared to dark object 116 having low reflection properties. Further, in case of bright ambient light conditions, for example due to sunlight, higher intensity may be required compared to shielded ambient light conditions.

In step a) 118 a single image of the object 116 may be captured and/or a plurality of images of the object 116 may be captured such as a sequence of images. For example, the capturing of the image may comprise recording continuously a sequence of images such as a video or a movie. The capturing in step a) 118 may take place in a time frame of less than 1 s, preferably in a timeframe of less than 0.5 s, more preferably in a timeframe of less than 0.1 s. The capturing of the at least one image of the object may be initiated by the user action or may automatically be initiated, e.g., once the presence of the at least one object 116 within a field of view and/or within a predetermined sector of the field of view of the camera 112 is automatically detected. These automatic image acquisition techniques are known, e.g., in the field of automatic barcode readers, such as from automatic barcode reading apps.

For example, in step a) 118, a plurality of images may be captured. The plurality of images may comprise the at least one sequence of images. In step b) 122 at least one image of the plurality of images may be selected and used which fulfills at least one pre-defined and/or pre-specified selection criterion. The pre-defined and/or pre-specified selection criterion may be provided in a lookup table and/or may be determined empirically or semi-empirical. The selection criterion may further, as an example, be stored in a storage device comprised by the mobile device 114. Specifically, the selection criterion may be stored in the storage device by a software, more specifically by an app. The pre-defined or pre-specified selection criterion may be selected from the group consisting of: at least one sharpness criterion; at least one spatial criterion; ambient light conditions. The sharpness criterion may comprise at least one sharpness threshold above which or equal to which the image is considered as "focused" or "sharp." The spatial criterion may comprise at least one angle threshold which refers to allowable deviations from a plane-parallel position of the mobile device 114 with respect to an arbitrary plane, for example of the object 116. Step b) 122 may comprise selecting the best image from the sequence of images, for example, the image fulfilling the pre-defined or pre-specified selection criterion best. The sequence of images may be captured continuously during at least one time interval. Step b) 122, for example the selection of the image, and/or step c) 126, may be performed online, i.e., during capturing the image sequence. The capturing may be repeated, for example until at least one image is determined fulfilling the selection criterion. As outlined above, the visual indication such as visual guidance may be given to the user when capturing the image of the object 116. For example, the visual indication may comprise a visualization of the object 116 or parts of the object 116 such as a contour and/or outline of the object 116. The visual indication may comprise an outline of the object 116 or a reference region on the object 116, for example a frame which corresponds to a shape of the object 116, superimposed on the display 140 of the mobile device 114, providing visual guidance for positioning the camera 112 relative to the object 116. The capturing of the at least one image of the object 116 may be initiated automatically in case it is determined that the sharpness criterion and/or the spatial criterion may be fulfilled, in particular in case it is determined that the outline of the object 116 of the visual indication overlays the object 116. Additionally or alternatively, audio guidance or other type of guidance may be given.

Figure 3:
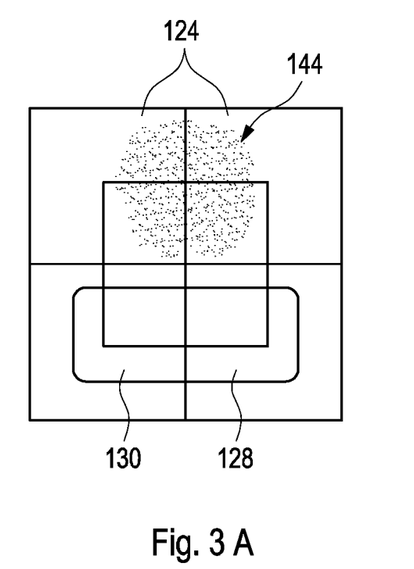
FIGS. 3A and 3B show embodiments of images captured by the mobile device.

FIGS. 3A and 3B show embodiments of images captured by the mobile device 114. From the image captured in step a) 118 at least one first area 124 in the image which is affected by direct reflection of light originating from the illumination source 120 and being reflected by the object 116 is determined. As shown in FIGS. 3A and 3B, a light spot 144 in the image is generated by direct reflection of a light beam 146 generated by the illumination source 120. The light spot 144 in the image may be a region which is brighter than surrounding image areas. A histogram analysis of the image may be used for determining the first area 124 in step b) 122. The histogram analysis may comprise determining a position of the first area 124 in the image. The histogram analysis may comprise determining a maximum intensity in the image and to determine a position of the maximum intensity in the image. The first area 124 may be determined by using at least one threshold of intensity in the histogram analysis. The histogram analysis may comprise at least one two-dimensional Gaussian fit. For example, image regions with intensities above 1σ may be considered as first area 124. The images shown in FIGS. 3A and 3B may be segmented into at least four segments, for example in quadrants. The first area 124 may be assigned to at least one first segment of the image. For example, in the image shown in FIG. 3A, the first area 124 may be determined to be located in the two upper segments of the quadrant. For example, in the image shown in FIG. 3B, the first area 124 may be determined to be located in the two lower segments.

In step c) 126 at least one second area 128 is determined in the image which essentially does not overlap with the first area 124 and returning the second area 128 as a target area 130 for the location of the test field 132 of the test strip 134 in the subsequent detection step. The second area 128 may be determined such that influences due to direct reflection of the light from the illumination source 120 are prevented and/or at least significantly reduced. The target area 130 may be determined to be off a zone, specifically off the first area 124, which is affected by direct optical reflection of the light from the illumination source 120. In addition, the target area 130 may be determined such that determination of the analyte is possible, e.g., that the test field 132 is illuminated sufficiently and lies within the cameras 112 field of view. The second area 128 may be determined to be an area of the image with essential homogenous illumination. The second area 128 may be determined to be an area with illumination intensities below at least one intensity threshold. The second area may be selected that illumination generated by the light spot from direct reflections is minimized. Thus, the second area 128 may be determined to be located in at least one other segment of the image different from the first segment in which the first area 124 was determined. Furthermore, the second area 128 may be determined to be separated sufficiently from image edges to allow sufficient illumination by the light source and to prevent boarder effects due to image edges. FIGS. 3A and 3B show determined second areas 128 and respective target regions 130. In FIG. 3A, where the first area 124 was determined to be located in the two upper segments, the second area 128 may be determined to be located in one or both of the two lower segments of the quadrant. In FIG. 3B, where the first area 124 was determined to be located in the two lower segments, the second area 128 may be determined to be in the two upper segments.

The information of the location of the target area 130 may be provided, e.g., as a prompt, to computing means, for example to an external computing means or computing means of the mobile device 114 such as to the processor 142. The processor 142 may adapt and/or generate the visual indication for positioning the test strip 134 and the mobile device 114 relative to each other based on the information of the location of the target area 130.

The detection method 115 comprises step 146 of providing the at least one test strip 134 for detecting the analyte in the sample. FIG. 2 shows an embodiment of the test strip 134 having the at least one test field 132 comprising at least one test chemical for performing an optical detection reaction in the presence of the analyte. The detection method 115 comprises step 148 of applying at least one sample to the test field 132 of the test strip 134.

Figure 4:
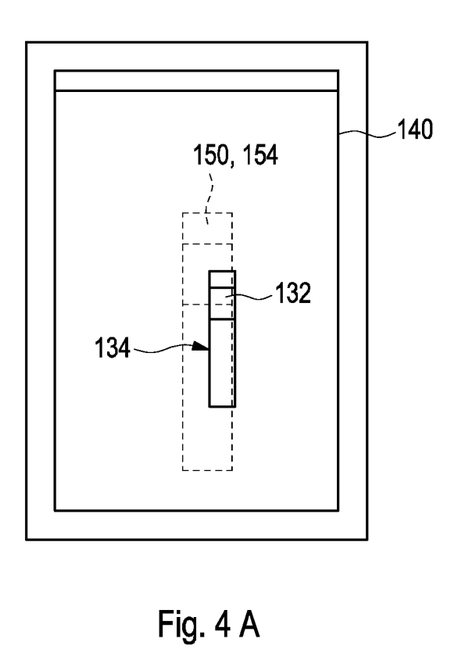
FIGS. 4A and 4B show embodiments of visual indications.

The detection method 115 comprises step 152 of providing visual indication 150 for the user to position the test strip 134 relative to the camera 112 such that the test field 132 at least partially is located in the target area 130. The target area 130 may have a shape identical with the shape or parts of the shape of the test strip 134. The target area 130 may be configured as an outline or overlay of the test strip 134. The visual indication 150 may be a superposition of a camera's live image on the display 140 of the mobile device 114 with the target area 130, e.g., the outline of the test strip 134. Thus, when the test strip 134 is positioned in the field of view of the camera 112 the visual indication 150 will show an overlay of the target area 130 and the test strip 134 allowing the user to match the target area 130 and easy positioning of the test strip 134. The visual indication 150 may comprise at least one instruction for the user such as a text message, for example a prompt, and/or at least one graphical instruction. For example, the visual indication may comprise a visualization of the test strip 134 or parts of the test strips 134 such as a contour and/or outline of the test strip 134. The visual indication 150 may specifically be a visual guidance and may be or may comprise an outline, for example in a shape of the test strip 134, superimposed on the display 140 of the mobile device 114, providing visual guidance for positioning the camera relative to the test strip 134. The visual indication 150 may comprise a visualization of the both of the mobile device 114 and the test strip 114 relative to each other. The visual indication 150 may comprise positioning information such orientation and/or distance prompts, for example at least one arrow and/or at least one text message. FIGS. 4A and 4B shows embodiments of visual indications 150 on the display 140 of the mobile device 114. In FIG. 4A, the visual indication 150 may comprise an overlay 154 corresponding to the test strip 134 which will be used in the detection method 115. The overlay 154 may be determined empirical and/or may be stored in at least one lookup table and/or in at least one data storage of the mobile device, e.g., by software, specifically by at least one app downloaded from an app store or the like. Further, on the display 140 the camera's live image of the test strip 134 may be shown such that the user may be adapted to match the overlay 154 and the test strip 134. In FIG. 4B, a further visual indication 150 is shown. In particular, the visual indication 150 may comprise a text message and graphical indication requesting the user to change side of the test strip.

The detection method 115 comprises step 156 of capturing at least one image of the test field 132 by using the camera 112, wherein during said capturing the illumination source 120 of the mobile device 114 is turned on. The detection method 115 comprises step 158 in which from the image captured in in the previous step 156, the analyte concentration in the sample is determined.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 calibration method
112 camera
114 mobile device
115 method for detecting an analyte
116 object
118 step a)
120 illumination source
122 step b)
124 first area
126 step c)
128 second area
130 target area
132 test field
134 test strip
136 packaging
138 position marker
140 display
142 processor
144 light spot
146 light beam
148 method step
150 visual indication
152 method step
154 overlay
156 method step
158 method step

What is claimed is:

1. A method for calibrating a camera of a mobile device for detecting an analyte in a sample, comprising:

a) capturing an image of an object using the camera, wherein during the capturing an illumination source of the mobile device is turned on;
b) determining from the captured image a first area in the image which is affected by direct reflection of light originating from the illumination source and reflected by the object, wherein a histogram analysis of the image is used to identify the first area; and
c) determining a second area in the image which does not substantially overlap with the first area and returning the second area as a target area for the location of a test field of a test strip in a detection step performed after the calibration.

2. The calibration method according to claim 1, wherein the first area is determined by using at least one threshold of intensity in the histogram analysis.

3. The calibration method according to claim 1, wherein the calibration method further accounts for a perspective and/or an angle between the camera and the object.

4. The calibration method according to claim 1, wherein:
the image captured in step a) comprises a plurality of images;
the plurality of images comprises at least one sequence of images; and
in step b) at least one image of the plurality of images is selected and used to fulfill a pre-defined selection criterion.

5. The calibration method according to claim 1, wherein in step a) a distance between the camera and the object is selected from the group consisting of: from 0.03 m to 0.3 m, from 0.03 to 0.15 m, and from 0.03 to 0.1 m.

6. The calibration method according to claim 1, wherein the test strip is separate from the object and the object used in step a) is selected from the group consisting of: at least one even surface; a reference card; at least one test strip container; at least one packaging.

7. The calibration method according to claim 1, wherein the illumination source of the mobile device comprises at least one light-emitting diode integrated therein.

8. The calibration method according to claim 1, wherein the capturing in step a) takes place in a time frame selected from the group consisting of: less than 1 s, less than 0.5 s, and less than 0.1 s.

9. A non-transitory computer readable medium having stored thereon computer executable instructions for performing the method of claim 1.

10. A mobile device, comprising:
a camera;
an illumination source; and
a processor or computer readable medium having stored thereon computer executable instructions for performing the method of claim 1.

11. A detection method for detecting an analyte in a sample using a camera of a mobile device, the method comprising:
a) capturing an image of an object using the camera, wherein during the capturing an illumination source of the mobile device is turned on;
b) determining from the captured image a first area in the image which is affected by direct reflection of light originating from the illumination source and reflected by the object, wherein a histogram analysis of the image is used to identify the first area;
c) determining a second area in the image which does not substantially overlap with the first area and returning the second area as a target area;

d) providing a test strip for detecting the analyte in the sample, the test strip having a test field comprising at least one test chemical for performing an optical detection reaction in the presence of the analyte;
e) applying a sample to the test field of the test strip;
f) providing visual indication for the user to position the test strip relative to the camera to thereby locate the test field at least partially in the target area;
g) capturing an image of the test field using the camera, wherein during the capturing the illumination source is turned on; and
h) determining, from the image captured in step g), the analyte concentration in the sample.

12. The detection method according to claim 11, wherein step h) comprises analyzing the color of a spot on the test field of the test strip, the spot at least partially comprising the sample.

13. A non-transitory computer readable medium having stored thereon computer executable instructions for performing the method of claim 11.

14. A mobile device, comprising:
a camera;
an illumination source; and
a processor or computer readable medium having stored thereon computer executable instructions for performing the method of claim 11.

15. The detection method according to claim 11, wherein the test strip is separate from the object used in step a).

16. The calibration method according to claim 1, wherein the first area is an area which is brighter than surrounding image areas due to the direct reflection of light originating from the illumination source.

17. The detection method according to claim 11, wherein the first area is an area which is brighter than surrounding image areas due to the direct reflection of light originating from the illumination source.

* * * * *